US012598112B2

(12) United States Patent
Kim et al.

(10) Patent No.: US 12,598,112 B2
(45) Date of Patent: Apr. 7, 2026

(54) METHOD FOR PERFORMING TRANSFER LEARNING, COMMUNICATION DEVICE, PROCESSING DEVICE, AND STORAGE MEDIUM

(71) Applicant: LG ELECTRONICS INC., Seoul (KR)

(72) Inventors: Yeongjun Kim, Seoul (KR); Sangrim Lee, Seoul (KR); Bonghoe Kim, Seoul (KR); Kyungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 18/726,926

(22) PCT Filed: Jan. 6, 2022

(86) PCT No.: PCT/KR2022/000221
§ 371 (c)(1),
(2) Date: Jul. 5, 2024

(87) PCT Pub. No.: WO2023/132384
PCT Pub. Date: Jul. 13, 2023

(65) Prior Publication Data
US 2025/0097119 A1      Mar. 20, 2025

(51) Int. Cl.
G06N 3/08 (2023.01)
G06N 3/04 (2023.01)
(Continued)

(52) U.S. Cl.
CPC ............. H04L 41/16 (2013.01); H04W 24/02 (2013.01)

(58) Field of Classification Search
CPC ......... H04L 41/16; H04W 24/02; G06N 3/08; G06N 3/04
See application file for complete search history.

(56) References Cited

U.S. PATENT DOCUMENTS

| | | | |
|---|---|---|---|
| 2017/0024641 A1* | 1/2017 | Wierzynski | ............ G06N 3/045 |
| 2019/0325350 A1* | 10/2019 | Desai | ...................... G06N 3/098 |

(Continued)

FOREIGN PATENT DOCUMENTS

| | | |
|---|---|---|
| JP | 2016-191966 A | 11/2016 |
| KR | 10-1592220 | 2/2016 |

(Continued)

*Primary Examiner* — Glenford J Madamba
*Assistant Examiner* — Hassan Abdur-Rahman Khan
(74) *Attorney, Agent, or Firm* — BRYAN CAVE LEIGHTON PAISNER LLP

(57) ABSTRACT

The communication device can perform hierarchical transfer learning (TL). The communication device may comprise: receiving information about channel characteristics from a plurality of user equipments including a first user equipment; mapping the plurality of user equipments to a plurality of TL levels and a plurality of groups for each of the plurality of TL levels on the basis of the information about the channel characteristics; and training a neural network of the first user equipment on the basis of the TL levels and the groups to which the plurality of user equipments is mapped. Training of the neural network of the first user equipment can comprise training a training portion for a first TL level from among TL levels to which the first user equipment is mapped.

9 Claims, 12 Drawing Sheets

(51) Int. Cl.
*H04L 41/16* (2022.01)
*H04W 24/02* (2009.01)

(56) References Cited

U.S. PATENT DOCUMENTS

| | | | |
|---|---|---|---|
| 2021/0045093 A1* | 2/2021 | Rao | H04W 76/14 |
| 2022/0070193 A1* | 3/2022 | Konda | H04L 63/029 |
| 2022/0150727 A1* | 5/2022 | Pezeshki | H04W 24/08 |
| 2022/0335294 A1* | 10/2022 | Pezeshki | G06N 3/063 |
| 2023/0153589 A1* | 5/2023 | Hwang | G06N 3/065 |
| | | | 706/26 |
| 2023/0180152 A1* | 6/2023 | Balevi | G06N 3/0464 |
| | | | 455/518 |
| 2023/0206095 A1* | 6/2023 | Karapantelakis | G06N 20/20 |
| | | | 706/46 |
| 2023/0216522 A1* | 7/2023 | Arslan | H03M 13/2909 |
| | | | 714/752 |
| 2023/0259744 A1* | 8/2023 | Moradi | G06N 3/0475 |
| | | | 706/28 |
| 2024/0127057 A1* | 4/2024 | Spathis | G06N 3/09 |
| 2024/0202542 A1* | 6/2024 | Lindbom | G06N 3/088 |
| 2024/0396766 A1* | 11/2024 | Jeong | G06N 3/0475 |
| 2025/0023714 A1* | 1/2025 | Kumar | G06N 20/00 |

FOREIGN PATENT DOCUMENTS

| | | |
|---|---|---|
| KR | 10-2021-0145923 | 12/2021 |
| WO | 2021/239201 A1 | 12/2021 |

* cited by examiner

FIG. 1 a) weight initialization b) selective fine-tuning

Frozen          Trainable (a)

(b)

METHOD FOR PERFORMING TRANSFER LEARNING, COMMUNICATION DEVICE, PROCESSING DEVICE, AND STORAGE MEDIUM

CROSS-REFERENCE TO RELATED APPLICATIONS

This application is a National Phase application under 35 U.S.C. 371 of International Application No. PCT/KR2022/000221, filed on Jan. 6, 2022, the contents of which are incorporated by reference herein in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation (e.g., 5G) communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

While 5G communication is still under development, there is an increasing demand for higher data rates to accommodate new services such as virtual reality and autonomous driving.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

To provide various types of communication services, applying artificial intelligence to wireless communication systems is being considered. Thus, methods for training artificial intelligence efficiently are needed.

The objects to be achieved with the present disclosure are not limited to what has been particularly described hereinabove and other objects not described herein will be more clearly understood by persons skilled in the art from the following detailed description.

In an aspect of the present disclosure, provided herein is a method of performing transfer learning (TL) by a communication device in a wireless communication system. The method includes: receiving information regarding channel characteristics from a plurality of user equipments (UEs) including a first UE; mapping the plurality of UEs to a plurality of TL levels and a plurality of groups for each of the plurality of TL levels based on the information regarding the channel characteristics; and training a neural network of the first UE based on the TL levels and groups to which the plurality of UEs are mapped. Training the neural network of the first UE includes training a training part for a first TL level among TL levels to which the first UE is mapped.

In another aspect of the present disclosure, provided herein is a communication device configured to perform TL in a wireless communication system. The communication device includes: at least one transceiver; at least one processor; and at least one computer memory operably connected to the at least one processor and configured to store instructions that, when executed, cause the at least one processor to perform operations. The operations include: receiving information regarding channel characteristics from a plurality of UEs including a first UE; mapping the plurality of UEs to a plurality of TL levels and a plurality of groups for each of the plurality of TL levels based on the information regarding the channel characteristics; and training a neural network of the first UE based on the TL levels and groups to which the plurality of UEs are mapped. Training the neural network of the first UE includes training a training part for a first TL level among TL levels to which the first UE is mapped.

In another aspect of the present disclosure, provided herein is a processing device for a communication device. The processing device includes: at least one processor; and at least one computer memory operably connected to the at least one processor and configured to store instructions that, when executed, cause the at least one processor to perform operations. The operations include: receiving information regarding channel characteristics from a plurality of UEs including a first UE; mapping the plurality of UEs to a plurality of TL levels and a plurality of groups for each of the plurality of TL levels based on the information regarding the channel characteristics; and training a neural network of the first UE based on the TL levels and groups to which the plurality of UEs are mapped. Training the neural network of the first UE includes training a training part for a first TL level among TL levels to which the first UE is mapped.

In a further aspect of the present disclosure, provided herein is a computer-readable storage medium configured to store at least one program code including instructions that, when executed, cause at least one processor to perform operations. The operations include: receiving information regarding channel characteristics from a plurality of UEs including a first UE; mapping the plurality of UEs to a plurality of TL levels and a plurality of groups for each of the plurality of TL levels based on the information regarding the channel characteristics; and training a neural network of the first UE based on the TL levels and groups to which the plurality of UEs are mapped. Training the neural network of the first UE includes training a training part for a first TL level among TL levels to which the first UE is mapped.

In each aspect of the present disclosure, training the training part for the first TL level among the TL levels to which the first UE is mapped may include: generating first transfer information based on learning results received from other UEs belonging to a first TL level group to which the first UE is mapped among groups of the first TL level; and transferring the first transfer information to the first UE.

In each aspect of the present disclosure, training the neural network of the first UE may include: training a training part for a second TL level among the TL levels to which the first UE is mapped, wherein the second TL level is different from the first TL level; generating second transfer information based on learning results received from other UEs belonging to a second TL level group to which the first UE is mapped among groups of the second TL level; and transferring the second transfer information to the first UE. The groups of the second TL level may be included in one of the groups of the first TL level.

In each aspect of the present disclosure, the first transfer information may include parameters and weights of a neural network trained by the other UEs belonging to the first TL level group.

The foregoing solutions are merely a part of the examples of the present disclosure and various examples into which the technical features of the present disclosure are incorporated may be derived and understood by persons skilled in the art from the following detailed description.

According to implementations of the present disclosure, a wireless communication signal may be efficiently transmitted/received. Accordingly, the overall throughput of a wireless communication system may be improved.

According to implementations of the present disclosure, a wireless communication system may efficiently support various services with different requirements.

According to implementations of the present disclosure, delay/latency occurring during wireless communication between communication devices may be reduced.

According to some implementations of the present disclosure, training of artificial intelligence may be efficiently performed.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 1 illustrates an example of a communication system 1 to which implementations of the present disclosure are applied;

DETAILED DESCRIPTION

Figure 2:
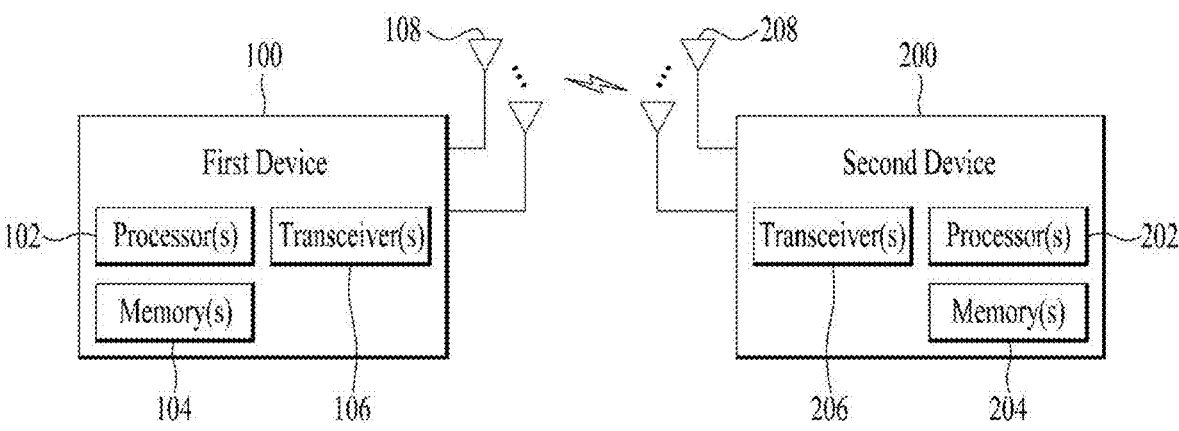
FIG. 2 is a block diagram illustrating examples of communication devices capable of performing a method according to the present disclosure.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption." This also may mean that a channel reception entity receives or decodes the channel in the form of conforming to the "assumption" on the premise that the channel has been transmitted in compliance with the "assumption."

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, the term user is used to refer to a UE. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a transmission and reception point (TRP) refers to a fixed point capable of transmitting/receiving a radio signal to/from a UE by communication with the UE. Various types of BSs may be used as TRPs regardless of the names thereof. For example, a BS, NB, eNB, pico-cell eNB (PeNB), home eNB (HeNB), relay, repeater, etc. may be a TRP. Furthermore, a TRP may not be a BS. For example, a radio remote head (RRH) or a radio remote unit (RRU) may be a TRP. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per TRP. An antenna may refer to a physical antenna port or refer to a virtual antenna or an antenna group. The TRP may also be called a point.

In the present disclosure, a cell refers to a specific geographical area in which one or more TRPs provide communication services. Accordingly, in the present disclosure, communication with a specific cell may mean communication with a BS or a TRP providing communication services to the specific cell. A DL/UL signal of the specific cell refers to a DL/UL signal from/to the BS or the TRP providing communication services to the specific cell. A cell providing UL/DL communication services to a UE is especially called a serving cell. Furthermore, channel status/quality of the specific cell refers to channel status/quality of a channel or a communication link generated between the BS or the TRP providing communication services to the specific cell and the UE. In 3GPP-based communication systems, the UE may measure a DL channel state from a specific TRP using cell-specific reference signal(s) (CRS(s)) transmitted on a CRS resource and/or channel state information reference signal(s) (CSI-RS(s)) transmitted on a CSI-RS resource, allocated to the specific TRP by antenna port(s) of the specific TRP.

A 3GPP-based communication system uses the concept of a cell in order to manage radio resources, and a cell related with the radio resources is distinguished from a cell of a geographic area.

The "cell" of the geographic area may be understood as coverage within which a TRP may provide services using a carrier, and the "cell" of the radio resources is associated with bandwidth (BW), which is a frequency range configured by the carrier. Since DL coverage, which is a range within which the TRP is capable of transmitting a valid signal, and UL coverage, which is a range within which the TRP is capable of receiving the valid signal from the UE, depend upon a carrier carrying the signal, coverage of the TRP may also be associated with coverage of the "cell" of radio resources used by the TRP. Accordingly, the term "cell" may be used to indicate service coverage by the TRP sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. In this case, the carrier frequency may be equal to or different from a center frequency of each cell or CC.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PC-FICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources (e.g., a set of REs) that carry DL data. The PUCCH, PUSCH, and PRACH refer to a set of time-frequency resources (i.e., a set of REs) that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

Figure 1:
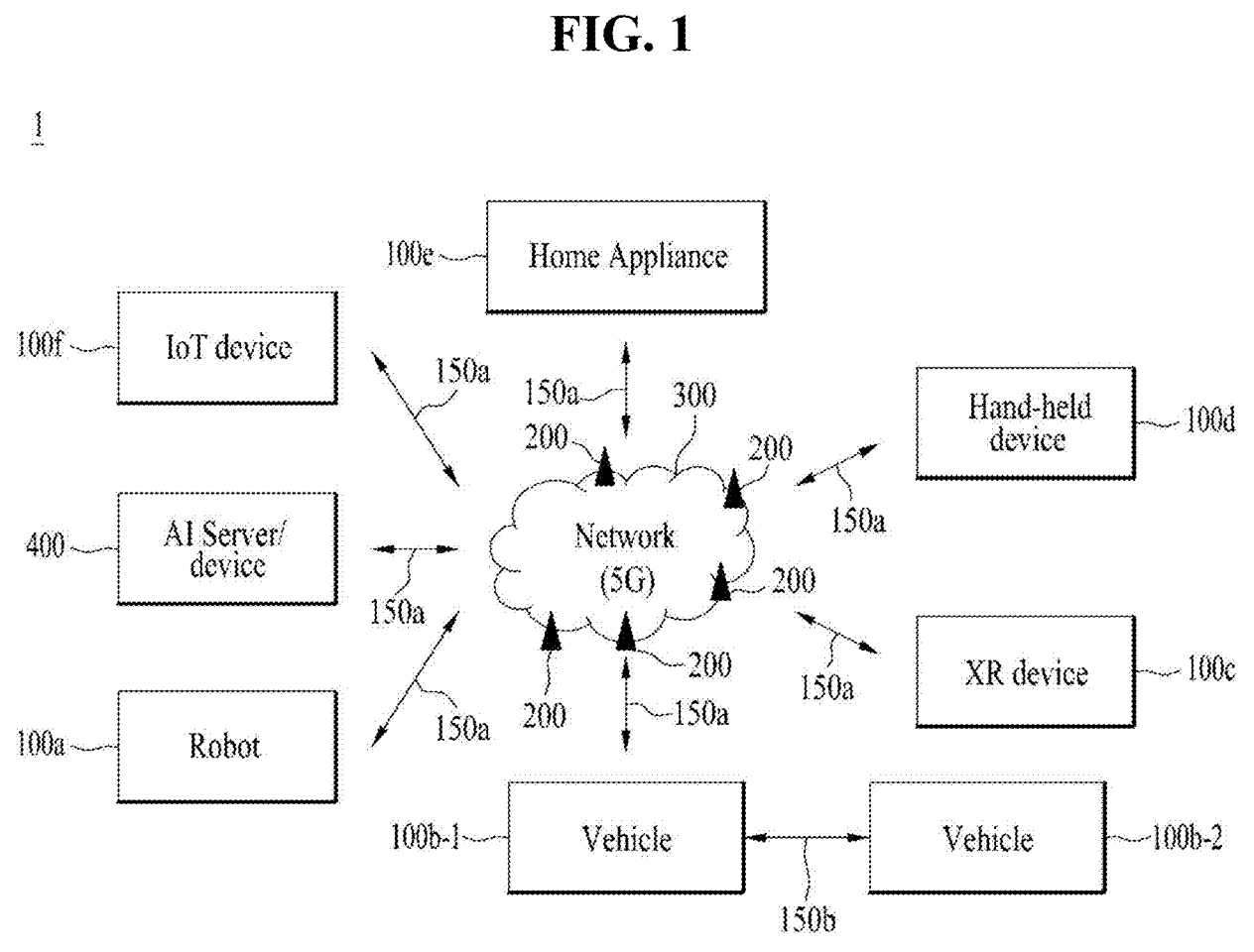

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using radio access technology (RAT) (e.g., 5G New RAT (NR) or LTE (e.g., E-UTRA), 6G) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network or 6G network to be introduced in the future. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs. The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs. Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement wireless communication technology. The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement wireless communication technology. The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and

206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
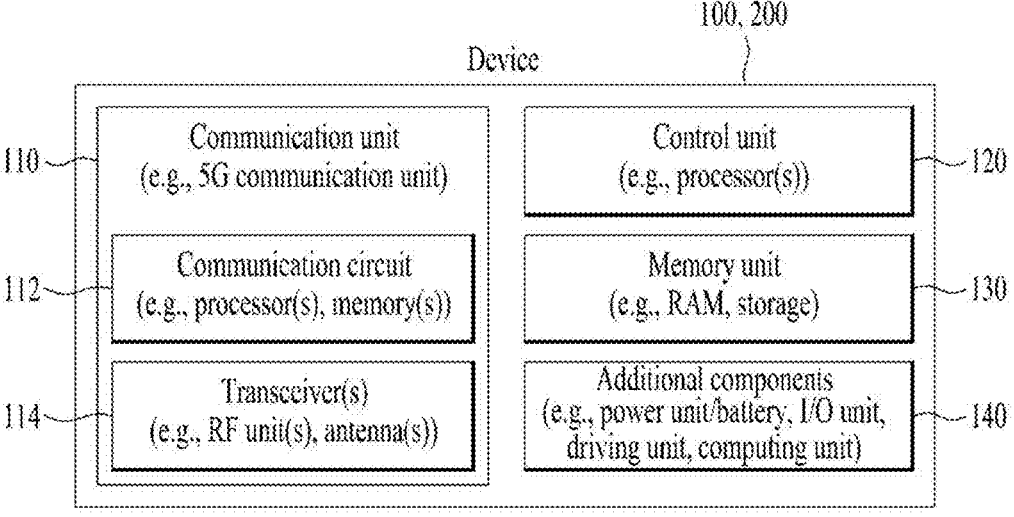
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a transitory memory, a non-transitory memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-transitory) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-transitory) storage medium A communication device of the present disclosure includes at least one processor; and at least one computer memory operably connected to the at least one processor and configured to store instructions for causing, when executed, the at least one processor to perform operations according to example(s) of the present disclosure described later.

Wireless communication systems are extensively deployed to provide various types of communication services such as voice and data. The demand for higher data rates is increasing to accommodate incoming new services and/or scenarios where the virtual and real worlds blend. To address these ever-growing demands, new communication technologies beyond 5G are required. New communication technologies beyond 6G systems (hereinafter referred to as 6G) aim to achieve (i) extremely high data speeds per device, (ii) very large number of connected devices, (iii) global connectivity, (iv) ultra-low latency, (v) reducing energy consumption of battery-free IoT devices, (vi) ultra-reliable connections, (vii) connected intelligence with machine learning capabilities. In the 6G system, the following technologies are being considered: artificial intelligence (AI), terahertz (THz) communication, optical wireless communication (OWC), free space optics (FSO) backhaul network, massive multiple-input multiple-output (MIMO) technology, blockchain, three-dimensional (3D) networking, quantum communication, unmanned aerial vehicle (UAV), cell-free communication, integration of wireless information and energy transmission, integration of sensing and communication, integration of access backhaul networks, hologram beamforming, big data analysis, large intelligent surface (LIS), and so on.

In particular, there has been a rapid increase in attempts to integrate AI into communication systems. Methods being attempted in relation to AI may be broadly categorized into two: AI for communications (AI4C), which uses AI to enhance communication performance, and communications for AI (C4AI), which develops communication technologies to support AI. In the AI4C field, designs have been attempted to replace the roles of channel encoders/decoders, modulators/demodulators, or channel equalizers with end-to-end autoencoders or neural networks. In the C4AI field, as one type of distributed learning, federated learning involves updating a common prediction model by sharing only the weights and gradients of models with the server without sharing device raw data while protecting privacy. In addition, there is a method for distributing the loads of devices, network edges, and cloud servers based on split inference.

Introducing AI into communications may simplify and enhance real-time data transmission. AI may use numerous analytics to determine a method of performing complex target tasks. In other words, AI may increase efficiency and reduce processing delays.

Time-consuming tasks such as handover, network selection, and resource scheduling may be instantly performed using AI. AI may also play a significant role in machine-to-machine, machine-to-human, and human-to-machine communications. AI-based communication systems may be supported by meta-materials, intelligent architectures, intelligent networks, intelligent devices, intelligence cognitive radio, self-sustaining wireless networks, and machine learning.

Recent attempts to integrate AI into wireless communication systems have primarily focused on the application layer, network layer, and particularly on wireless resource management and allocation. However, research into integrating AI into wireless communication systems is increasingly evolving towards the MAC layer and the physical layer. In particular, there are emerging attempts to combine deep learning with wireless transmission at the physical layer. AI-based physical layer transmission refers to applying signal processing and communication mechanisms based on AI drivers rather than traditional communication frameworks in fundamental signal processing and communication mechanisms. For example, the AI-based physical layer transmission may include deep learning-based channel coding and decoding, deep learning-based signal estimation and detection, deep learning-based MIMO mechanisms, AI-based resource scheduling and allocation, and the like.

Machine learning may be used for channel estimation and channel tracking. Machine learning can be used for power allocation, interference cancellation, etc. in the DL physical layer. Machine learning may also be used in MIMO systems for antenna selection, power control, and symbol detection.

However, applying deep neural networks for transmission at the physical layer may have the following issues.

Deep learning-based AI algorithms require a large amount of training data to optimize training parameters. However, due to limitations in acquiring data from specific channel environments, a significant amount of training data is often used offline. Static training of training data in specific channel environments may lead to contradictions between the dynamic features and diversity of wireless channels.

Furthermore, current deep learning primarily targets real signals. However, signals at the physical layer of wireless communication are complex signals. More research is needed on neural networks for detecting complex-domain signals to match the characteristics of wireless communication signals.

Hereinafter, machine learning will be described in detail.

Machine learning refers to a series of operations for training machines to perform tasks that are difficult to be performed by human. Machine learning requires data and learning models. In machine learning, data learning methods may be broadly categorized into three types: supervised learning, unsupervised learning, and reinforcement learning.

Neural network learning aims to minimize errors in outputs. Neural network learning refers to a process of repeatedly inputting training data to a neural network, calculating the error of the output and target of the neural network for the training data, backpropagating the error of the neural network from the output layer of the neural network to the input layer to reduce the error, and updating the weight of each node of the neural network.

Supervised learning may use training data labeled with a correct answer, whereas unsupervised learning may use training data that is not labeled with a correct answer. For example, in the case of supervised learning for data classification, training data may be labeled with each category. The labeled training data may be input to the neural network, and the output (category) of the neural network may be compared with the label of the training data, thereby calculating the error. The calculated error may be backpropagated through the neural network in reverse (that is, from the output layer to the input layer), and the connection weight(s) of each node of each layer of the neural network may be updated based on the backpropagation. Changes in the updated connection weight(s) of each node may be determined based on the learning rate. The calculation of the neural network for input data and the backpropagation of the error may configure a learning epoch. The learning data may be applied differently depending on the number of repetitions of the learning epoch of the neural network. For example, in the early phase of learning of the neural network, a high learning rate may be used to increase efficiency such that the neural network rapidly ensures a certain level of performance, but in the late phase of learning, a low learning rate may be used to increase accuracy.

The learning method may vary depending on the feature of data. For example, learning may be performed based on supervised learning rather than unsupervised learning or reinforcement learning to allow a receiver to accurately predict data transmitted from a transmitter in a communication system.

The learning model corresponds to the human brain. To this end, the most basic linear model may be considered. However, a machine learning paradigm that uses highly complex neural network structures such as artificial neural networks as learning models is referred to as deep learning.

Neural network cores used for learning may be broadly categorized into a deep neural network (DNN), a convolutional deep neural network (CNN), and a recurrent neural machine (RNN).

Figure 4:
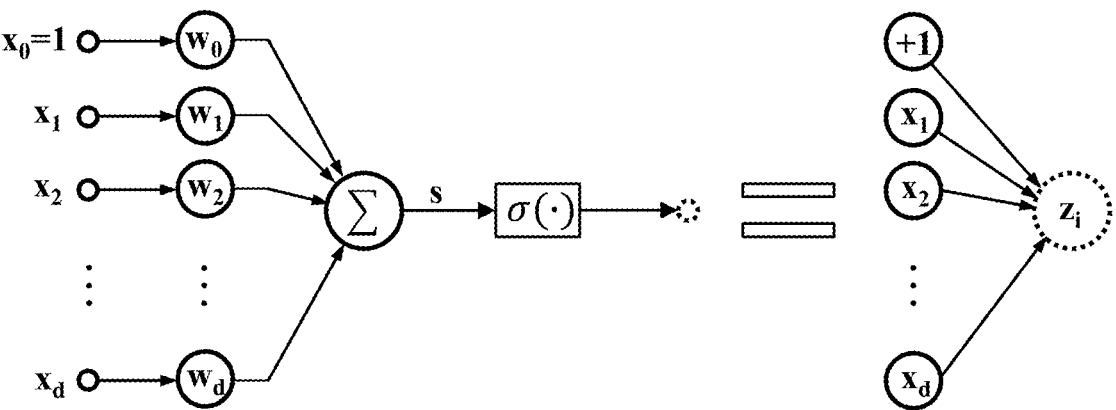
FIG. 4 illustrates a perceptron structure used in an artificial neural network.

FIG. 4 illustrates a perceptron structure used in an artificial neural network.

An artificial neural network may be implemented by connecting multiple perceptrons. Referring to FIG. 4, a process of receiving an input vector of $x=(x_1, x_2, \ldots, x_d)$, multiplying each component by a weight of $w=(w_1, w_2, \ldots, w_d)$, summing up the results, and then applying) is referred to as a perceptron. For a large artificial neural network structure, the simplified perceptron structure shown in FIG. 14 may be extended. For a large artificial neural network structure, the simplified perceptron structure shown in FIG. 4 may be extended and applied to a multi-dimensional perceptron with different input vectors.

Figure 5:
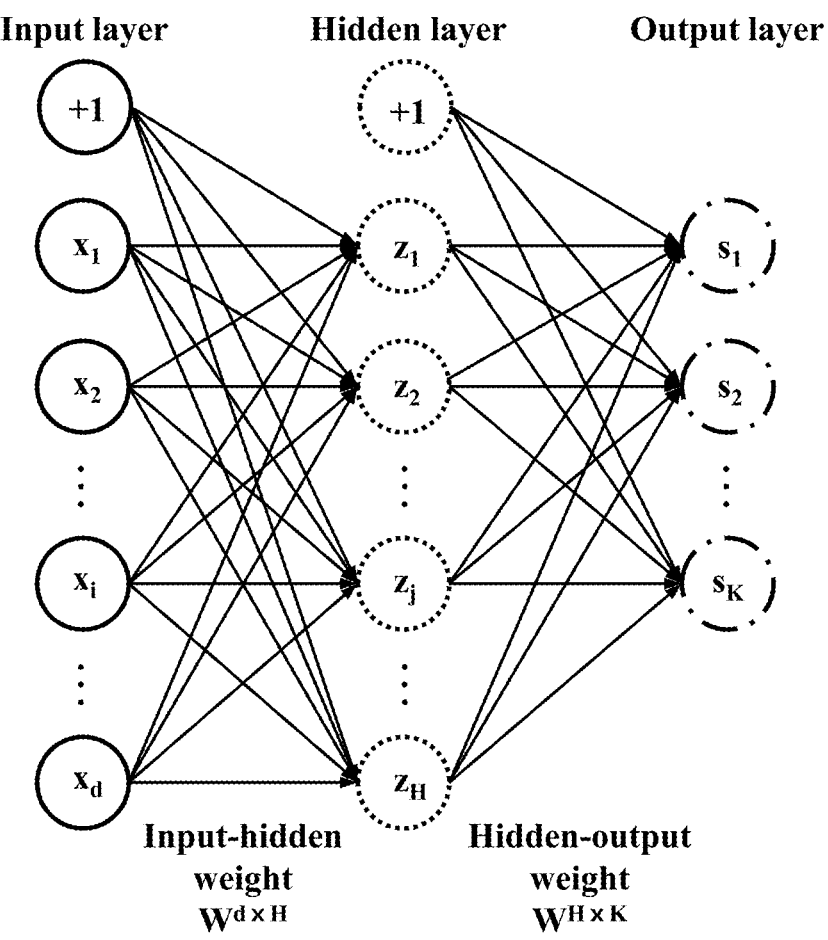
FIG. 5 illustrates a multilayer perceptron structure.

FIG. 5 illustrates a multilayer perceptron structure.

The perceptron structure shown in FIG. 4 may be extended to a multilayer perceptron structure having a total of three layers based on input and output values. An artificial neural network having H perceptrons of (d+1) dimensions between the first and second layers and K perceptrons of (H+1) dimensions between the second and third layers may be represented by the multilayer perceptron structure shown in FIG. 5.

A layer where input vectors are located is called an input layer, a layer where final output value(s) are located is called an output layer, and all layers between the input and output layers are referred to as hidden layers. In the example of FIG. 5, three layers are illustrated. However, since the actual number of layers in an artificial neural network is counted excluding the input layer, the artificial neural network based on the multilayer perceptron structure in FIG. 5 may be considered as having two layers. An artificial neural network is constructed by two-dimensionally connecting perceptrons of basic blocks.

In a neural network, layers are composed of small individual units called neurons. In the neural network, neurons receive inputs from other neurons, perform processing, and produce outputs. A region within the previous layer where each neuron receives inputs is called a receptive field. Each neuron computes output values by applying a specific function to input values received from the receptive field within the previous layer. The specific function applied to the input values is determined by i) a vector of weights and ii) biases. Learning in the neural network is performed based on iterative adjustment of the biases and weights. The vector of weights and the biases are called filters, which represent particular features of the input.

The aforementioned input layer, hidden layer, and output layer may be commonly applied not only to the multilayer perceptron structure but also to various artificial neural network structures such as CNNs, which will be discussed later. As the number of hidden layers increases, the artificial neural network becomes deeper, and the machine learning paradigm that uses sufficiently deep artificial neural networks as learning models is called deep learning. In addition, an artificial neural network used for deep learning are called DNNs.

The aforementioned multilayer perceptron structure is referred to as a fully-connected neural network. In the fully-connected neural network, there are no connections between neurons within the same layer, and connections exist only between neurons in adjacent layers. A DNN, which has the fully-connected neural network structure, includes multiple hidden layers and combinations of activation functions, and thus the DNN may be effectively applied to capture the characteristics of correlation between inputs and outputs. Here, the correlation characteristic may mean the joint probability of inputs and outputs.

On the other hand, various artificial neural network structures distinct from the DNN may be formed depending on how multiple perceptrons are connected to each other.

Figure 6:
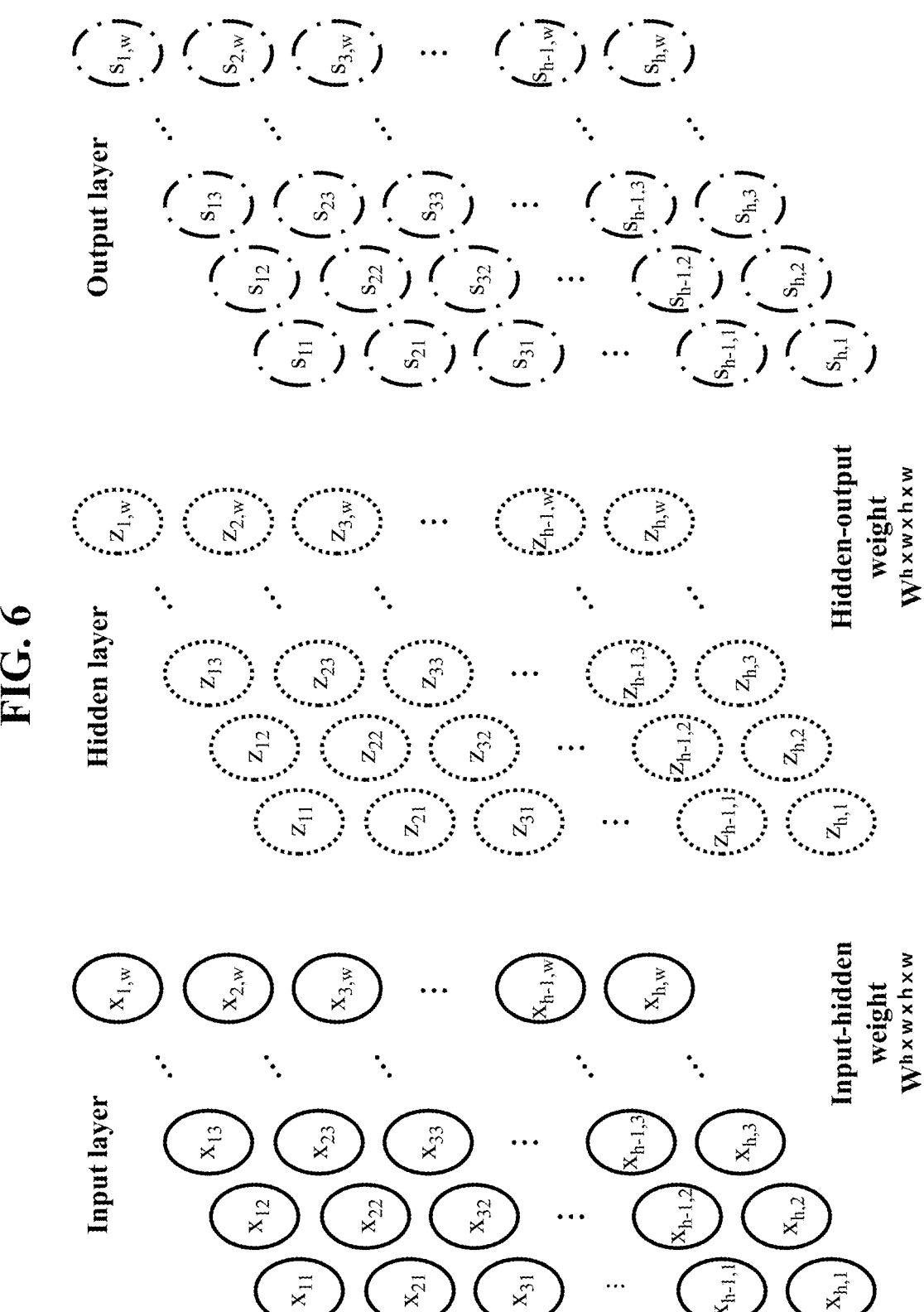
FIG. 6 illustrates the structure of a convolutional neural network (CNN)

FIG. 6 illustrates the structure of a CNN.

In a DNN, neurons within a layer are arranged in a one-dimensional manner. However, referring to FIG. 6, in the CNN, neurons may be assumed to be arranged in a two-dimensional manner, with w neurons horizontally and h neurons vertically. In this case, since a weight is added for each connection from a single input neuron to hidden layers, a total of h×w weights need to be considered. Since there are h×w neurons in input layers, a total of $h^2w^2$ weights are required between two adjacent layers.

Figure 7:
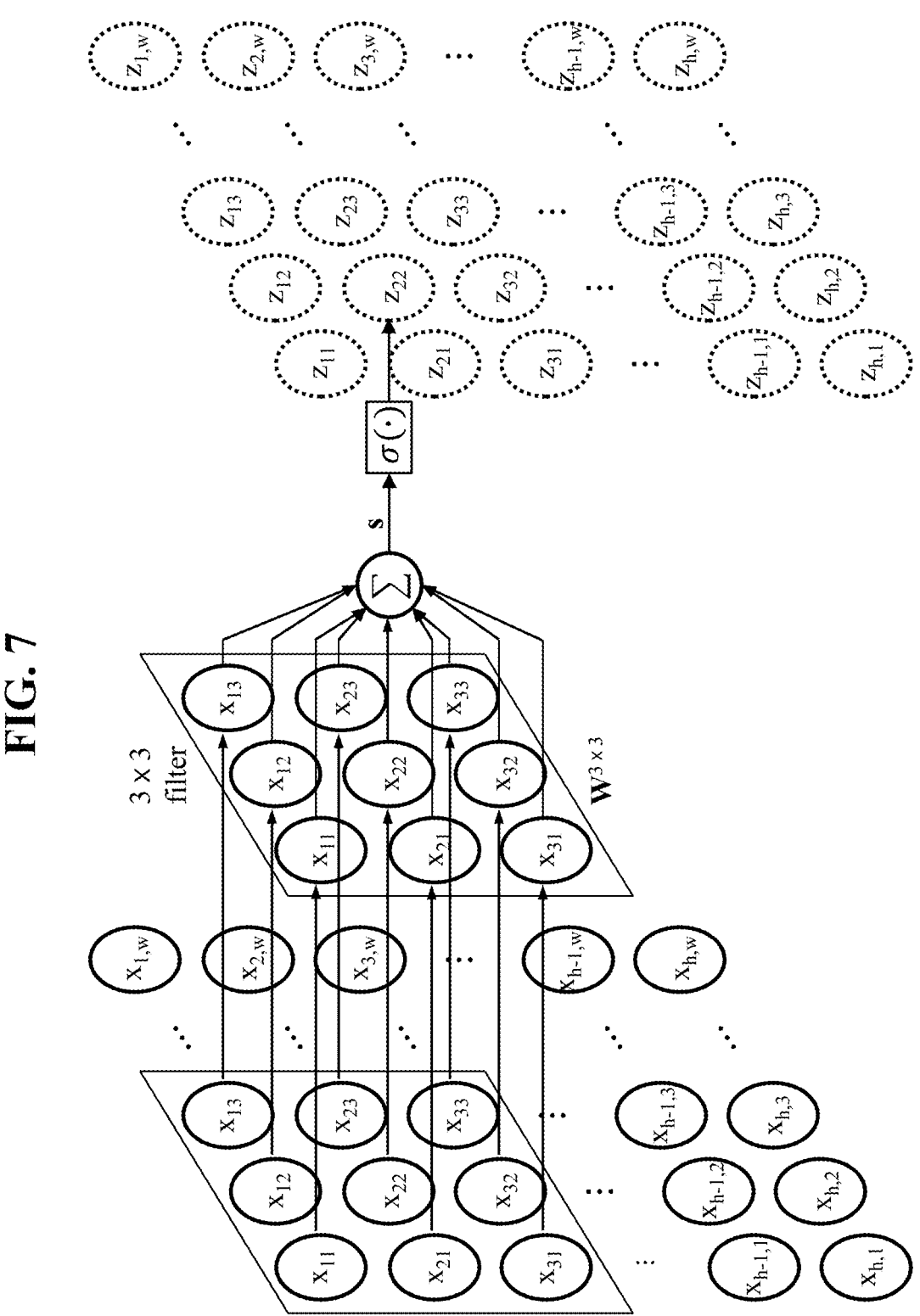
FIG. 7 illustrates a filtering operation in a CNN.

FIG. 7 illustrates a filtering operation in a CNN.

The CNN shown in FIG. 6 faces the issue of an exponential increase in the number of weights depending on the number of connections. Thus, small-sized filters are assumed to exist instead of considering connections between all neurons in adjacent layers. Then, weighted sum and activation function operations are performed on overlapping regions of filter as shown in FIG. 7.

A single filter has weights corresponding to the size of the filter and may undergo learning of the weights such that the filter extracts specific features from an image as factors and produce outputs based on the factors. In FIG. 7, a 3×3 filter is applied to a top-left 3×3 region of an input layer, and an output value obtained by performing the weighted sum and activation function operations on related neurons is stored in $z_{22}$.

The filter scans the input layer, performs the weighted sum and activation function operations while moving horizontally and vertically at regular intervals, and places the output value at the current position of the filter. This operation method is similar to a convolution operation on images in the field of computer vision. Thus, a DNN with such a structure is called a CNN, and a hidden layer generated by the convolution operation is referred to as a convolutional layer. In addition, a neural network with multiple convolutional layers is called a deep convolutional neural network (DCNN).

In the convolutional layer, the weighted sum is calculated by considering only neuron(s) located within a region covered by the current filter, thereby reducing the number of weights. As a result, a single filter may focus on features within a local region. Therefore, the CNN may be effectively applied to process image data where a physical distance in two-dimensional space is an important criterion. In the CNN, multiple filters may be applied immediately before the convolutional layer, and multiple output results may be produced by convolution operations of each filter.

The fully connected layer connects every neuron in one layer to every neuron in another layer.

Neural network (NN) systems have an advantage of being capable of solving or optimizing difficult problems based on non-linearity. For NN-based wireless communication systems, there is ongoing research on NN techniques for simultaneously optimizing channel coding, modulation, and filtering at a transmitter and channel estimation and signal detection algorithms at a receiver. While the NN system has these advantages, an NN need to be trained to adapt appropriately to a channel environment to maximize the performance of the NN system. Speeding up the training affects the performance of a communication system where the NN is applied. Offline learning training methods are being considered to speed up the training of the NN. However, since offline learning has a disadvantage of being incapable of adaptively adapting to channels, the offline learning has challenges in optimizing the performance of the NN system. Therefore, research is being conducted on online learning to speed up the training of the NN and adapt the NN adaptively to channels. In particular, transfer learning is considered for the NN to effectively perform online learning.

Hereinafter, some implementations of the present disclosure for applying transfer learning to a wireless communication system in consideration of a wireless channel environment will be described.

First, transfer learning (TL) and hierarchical feature representations will be briefly explained to facilitate understanding of some implementations of the present disclosure.

Transfer Learning (TL)

TL is a machine learning approach that focuses on storing knowledge acquired by solving one problem and applying the knowledge to different but related problems. The key idea of TL is to synthesize distilled knowledge accumulated from past diverse experiences as well as similar tasks to facilitate learning of new problems. TL techniques may reduce dependency on labeled data, improve the speed of learning, and enhance the robustness of machine learning to diverse wireless environments.

For example, TL may transmit the results learned at different times or from different tasks to an NN, enabling the NN to perform learning more quickly and with less computational load. Deep learning, which is a type of machine learning, uses a multi-layer architecture called a deep neural network (DNN), which is inspired by the structure of the human brain and consist of input layers, output layers, and multiple hidden layers therebetween as described above. The DNN is trained to perform specific tasks such as classification, clustering, or regression, and during the learning process, the DNN use the knowledge thereof to execute the trained tasks. A trained deep learning model including architectures and parameters may be considered as knowledge obtained from training data. Deep learning may be considered as a means for TL to transfer knowledge between different domains. In the case of deep learning, information transfer between NNs for TL may involve transfer of parameters, weights, and so on.

Figure 8:
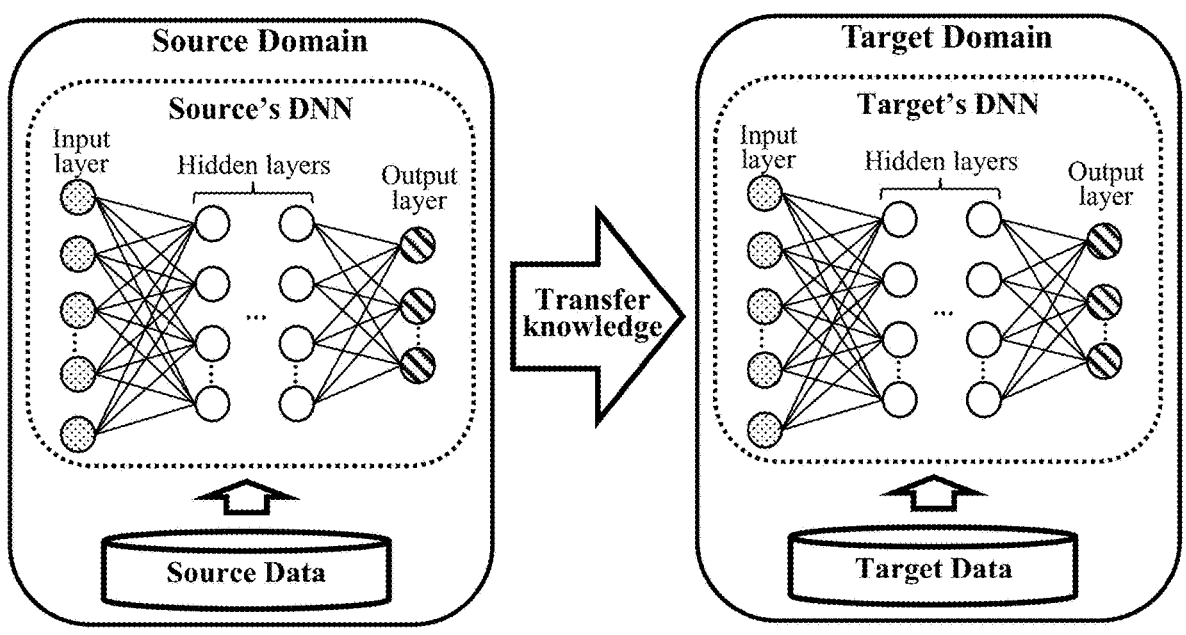
FIG. 8 illustrates an example of transfer learning (TL) to which deep learning is applied.

FIG. 8 illustrates an example of TL to which deep learning is applied.

The strategies used in deep transfer learning (DTL) may be categorized into the following three strategies.

1) Off-the-shelf pre-trained models: Training deep learning models for complex tasks requires a significant amount of data and time. Such a lengthy training process is one of the major obstacles that hinders the progress of deep learning. Thus, pre-trained models, i.e., models trained from neighboring domains directly affect a target task, instead of training a DNN at the beginning. When the domains and tasks of a source and target are similar, the learned results of the source task learned in the source domain may be directly applicable to the target task in the target domain.

2) Pre-trained models as feature extractors: For traditional machine learning algorithms, raw data may not be directly used as an input, and preprocessing is required to extract features. A DNN may learn these features automatically. Based on the deep learning capability, pre-trained models may be used as feature extractors for target domain data. In particular, target data is provided to the pre-trained models to obtain new feature representations before being used. The new representations combined with knowledge from the source domain may enhance the learning process. As the feature extractors, the pre-trained models may be used when the source and target domains are similar but the source and target tasks are different. In this case, the learned results of the source task learned in the source domain may be used as the feature extractors in the target domain.

3) Fine tuning pre-trained models: Fine-tuning pre-trained models are similar to the second strategy described above in that pre-trained models are used. However, all or part of pre-trained source models may be continuously trained with target data to further enhance the effectiveness of knowledge transfer, instead of freezing all parameters of the pre-trained models. The fine-tuning pre-trained models may be applied when the source and target domains are related but different and when the source and target tasks are the same. The learned results of the source task learned in the source domain are fine-tuned in the target domain.

In some implementations of the present disclosure, fine-tuning pre-trained models among the three strategies described above are used to perform end-to-end learning.

Figure 9:
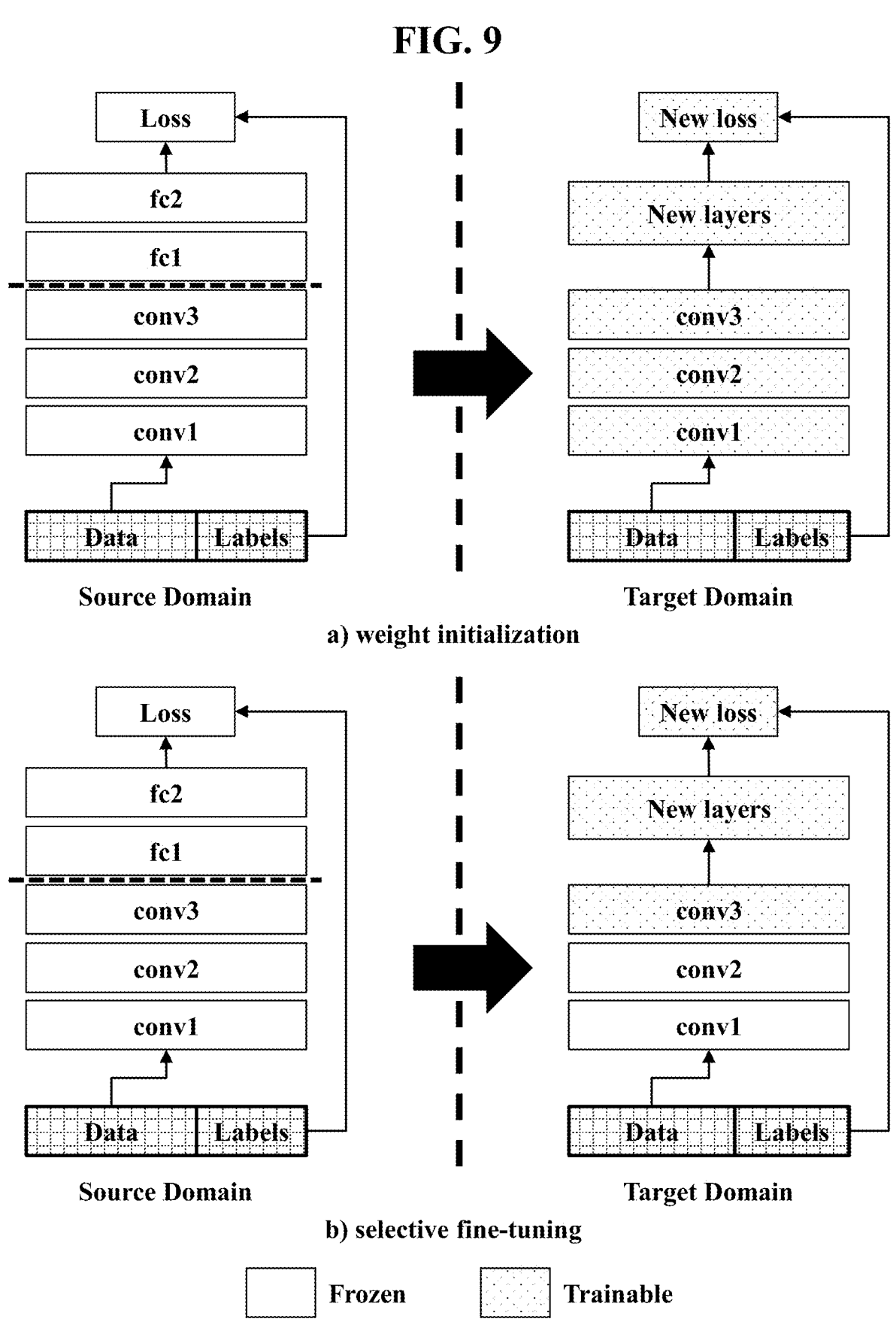
FIG. 9 is a conceptual diagram illustrating TL to which fine-tuning pre-trained models are applied.

FIG. 9 is a conceptual diagram illustrating TL to which fine-tuning pre-trained models are applied. In FIG. 9, "fc" represents a fully-connected layer, and "conv" represents a convolutional layer.

Referring to FIG. 9, fine-tuning of pre-trained models may be performed according to the following two methods: a) weight initialization, and b) selective fine-tuning.

a) Weight initialization: The parameters of a target model are first initialized by the parameters of a pre-trained model. Then, a new model is trained with target domain data. Weight initialization is often applied when the target domain has a significant amount of labeled data.

b) Selective fine-tuning: Considering that lower layers in a DNN are capable of learning (domain-independent) general features and higher layers are capable of learning (domain-dependent) specific features, it may be determined how many layers of a pre-trained model need to be tuned. In particular, when target data is small and the DNN has a large number of parameters, more layers are frozen to prevent overfitting issues. On the other hand, when the target data is large and the DNN has a small number of parameters is small, more layers should be trained with new data.

In FIG. 9(a), the weights of all layers are updated during fine-tuning, while in FIG. 9(b), the weights of only selected layer(s) are updated.

Therefore, if the results learned in the source domain are appropriately selected, the learning speed in the target domain may be accelerated.

Hierarchical Feature Representations

Figure 10:
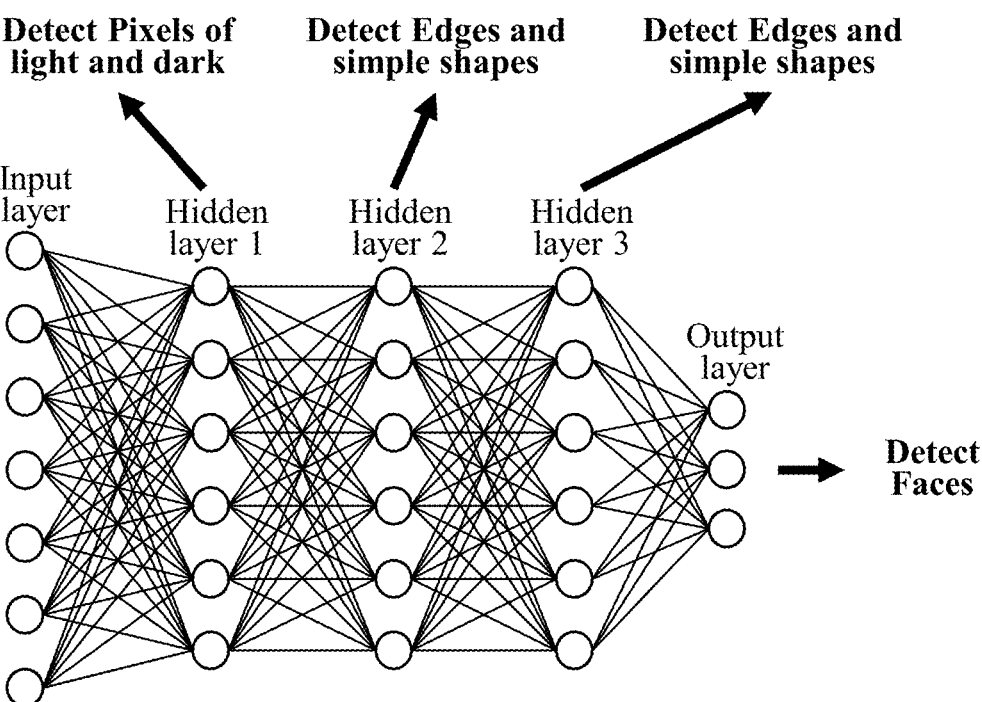
FIG. 10 is a diagram for aiding understanding of hierarchical feature representations.

FIG. 10 is provided to aid understanding of hierarchical feature representations. In particular, FIG. 10 illustrates hierarchical feature representations using an NN that distinguishes human faces as an example.

Since deep learning has an ability to learn hierarchical feature representations from a data set, deep learning may also be considered as learning hierarchical representations. In deep learning, the ability to represent (extract) channel distributions/characteristics varies depending on the position of each layer. In a DNN, as each layer goes deeper into the DNN, the layer learns different features from general (low-level) features to more specific (high-level) features. The features learned by deep learning are more transferable, which means that the features are capable of being more easily reused across similar domains. Higher-level features are primarily dependent on the domain and specific tasks, while lower-level features are more general. For example, referring to FIG. 10, when face recognition is performed, layers closer to the input layer of the DNN learn low-level features (e.g., pixels of light and dark), intermediate layers learn more complex and abstract features (e.g., edges and simple shapes) obtained by combining the low-level features, and layers closer to the output layer learn high-level features related to specific tasks (e.g., nose, eyes, and chin).

Deep Learning Depending on Channel Environments

In deep learning, if channel-adaptive learning is performed, learning may be performed on instantaneous values of a channel (e.g., coefficients of the channel when a signal is received), but learning may be performed on the distributions/characteristics of the channel. For example, the results learned for a specific power delay profile (PDP) may be commonly used by UEs operating in the corresponding PDP environment. In other words, deep learning may learn not only fixed values but also situations such as probability distributions. Here, the PDP refers to the positions of taps in the channel and the average power thereof. A multipath channel is represented by multiple paths with different delays and coefficients between a transmitter and receiver. The taps of the channel refer to the channel coefficients, each representing each path in the multipath channel.

Hereinafter, some implementations of the present disclosure will be described in more detail.

Figure 11:
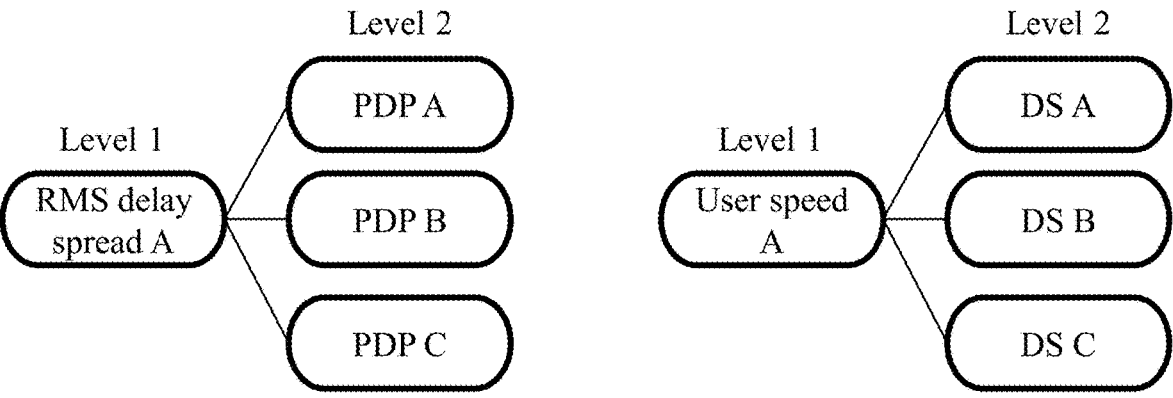
FIG. 11 illustrates an example of hierarchical representations and/or grouping of channel distributions/characteristics in a communication system according to some implementations of the present disclosure.

FIG. 11 illustrates an example of hierarchical representations and/or grouping of channel distributions/characteristics in a communication system according to some implementations of the present disclosure.

According to some implementations of the present disclosure, the channel distributions/characteristics of a communication system may be hierarchically represented and grouped. Referring to FIG. 11, PDPs A/B/C with the same root mean square (RMS) delay spread may be grouped as RMS delay spread group A, and Doppler spreads (DSs) A/B/C with the same maximum Doppler shift or user speed may be grouped as user speed A.

Figure 12:
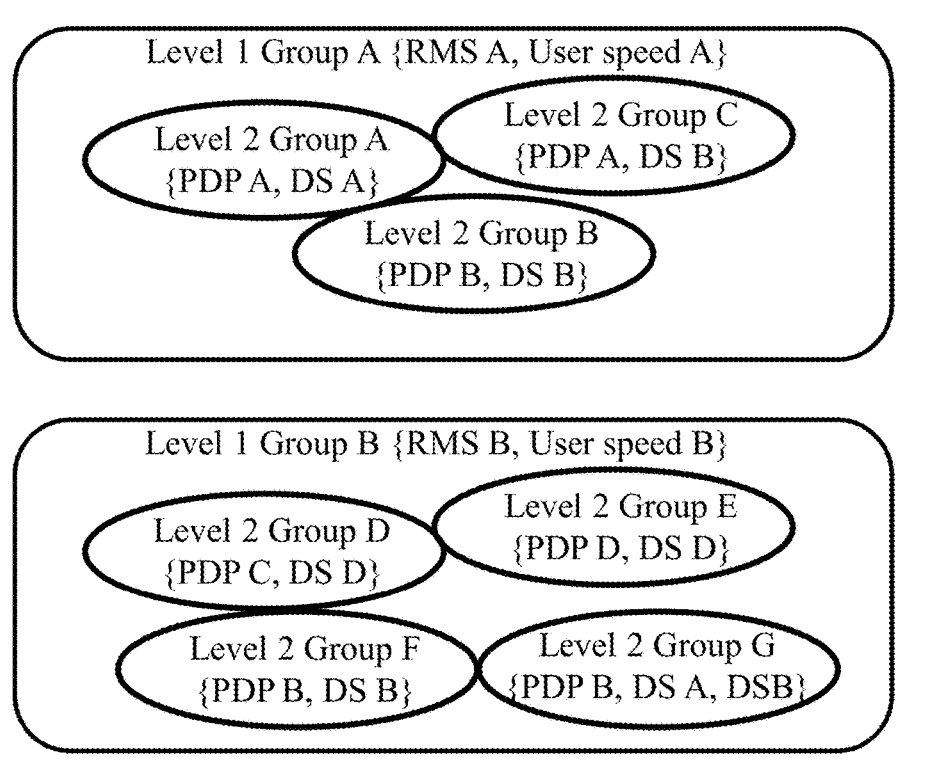
FIG. 12 illustrates an example of channel distributions/characteristics hierarchically represented and/or grouped according to some implementations of the present disclosure.

FIG. 12 illustrates an example of channel distributions/characteristics hierarchically represented and/or grouped according to some implementations of the present disclosure.

The channel distributions/characteristics learned by an NN through pre-training may be grouped as shown in the example of FIG. 12. In the example of FIG. 12, the channel distributions/characteristics are represented in two levels for the explanation of some implementations of the present disclosure. At level 1, channels are grouped based on RMS delay spreads and user speeds, and at level 2, channels are further grouped based on distributions and characteristics such as PDPs and DSs. In other words, in the example of FIG. 12, channel environments are first divided into Level 1 Group A and Level 1 Group B and then further divided into detailed groups at Level 2.

In some implementations of the present disclosure, channel distributions/characteristics may be divided into lower-layer representations indicating general features and higher-layer representations representing more specific and detailed features as described in FIGS. 11 and 12. In other words, in some implementations of the present disclosure, the channel distributions/characteristics may be distinguished by hierarchical representations.

Figure 13:
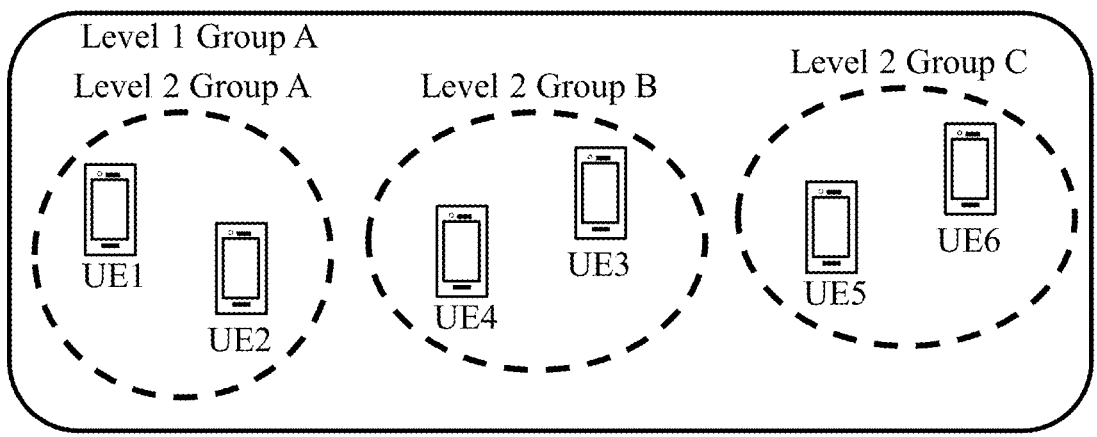
FIG. 13 illustrates an example in which user equipments (UEs) are mapped to groups of channel distributions/characteristics according to some implementations of the present disclosure.

FIG. 13 illustrates an example in which UEs are mapped to groups of channel distributions/characteristics according to some implementations of the present disclosure.

Referring to FIG. 13, UEs within each group possess the channel distributions/characteristics of the corresponding group. Therefore, in some implementations of the present disclosure, an NN may accelerate training by sharing the computational results of UEs during the training. In this case, fine-tuned parameters may be shared if TL is applied. Thus, parameters necessary for training may be provided for each group, instead of providing the parameters for each UE, thereby reducing signaling overhead during the training process of the NN.

In addition, in some implementations of the present disclosure, when TL is applied, the TL may be applied at the group level. Considering that each layer of deep learning is capable of representing (and/or extracting) different features, the training part (e.g., the weights, gradients, biases, etc., of some layers of the NN) and structure of TL may be determined for each level and each group.

Figure 14:
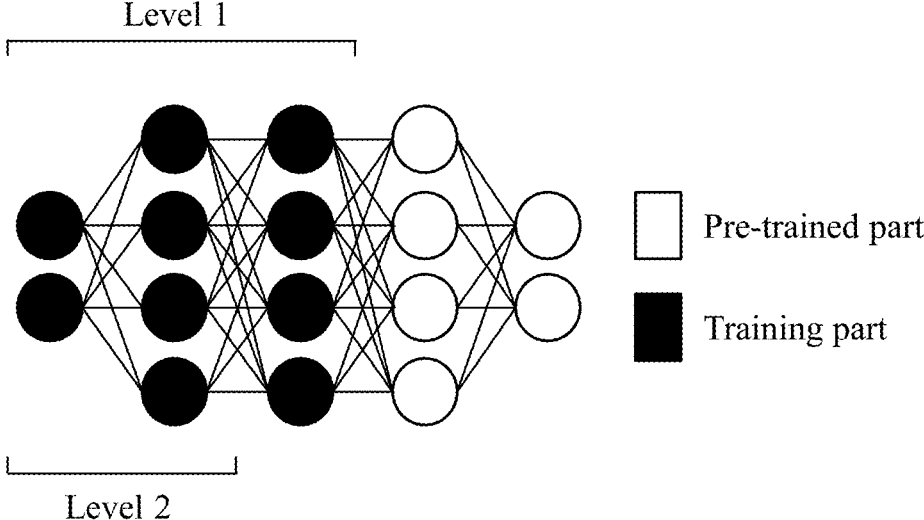
FIG. 14 illustrates an example of a neural network (NN) structure of TL to which hierarchical groups are applied according to some implementations of the present disclosure.

FIG. 14 illustrates an example of an NN structure of TL to which hierarchical groups are applied according to some implementations of the present disclosure.

In the example of FIG. 14, black circles represent a training part, while white circles represent a pre-trained part. In deep learning, hierarchical levels may also be applied to determine the structure of the training part. Therefore, in some implementations of the present disclosure, after determining the pre-trained and training parts, the structure of the training part may also be determined based on the levels of channel distributions/characteristics within the training part.

In the example of FIG. 14, the number of layers associated with the training part at Level 1 is greater than the number of layers associated with the training part at Level 2. However, depending on the implementation, NN layers used for training may partially overlap or may not overlap at all.

In some implementations of the present disclosure, hierarchical operations of TL may include the following operations.

Case 1: When there is a significant difference between the channel distributions/characteristics of a Level 1 group and the current channel distributions/characteristics.

Level 1 training part→large training part→large target data set→large group. That is, when there is a significant difference between the channel distributions/characteristics of the Level 1 group and the current channel distributions/characteristics, training is performed on the Level 1 training part, large training part, large target data set, and/or large group. In other words, general channel distributions/characteristics may be fine-tuned. For example, training on the Level 1 training part may be performed based on information on the channel distributions/characteristics obtained from UEs included in Level 1. Since the data at Level 1 is obtained from more UEs compared to the data at Level 2, training on the Level 1 training part may use more data than training on a Level 2 training part In this case, training is performed with a target data set collected from the UEs in the Level 1 group.

Case 2: When there is a small difference between the channel distributions/characteristics of the Level 1 group and the current channel distributions/characteristics.

Level 2 training part→small training part→small target data set→small group. That is, when there is a significant difference between the channel distributions/characteristics of the Level 2 group and the current channel distributions/characteristics, training is performed on the Level 2 training part, small training part, small target data set, and/or small group. In other words, specific channel distributions/characteristics may be fine-tuned. For example, training on the Level 2 training part may be performed based on information on the channel distributions/characteristics obtained from UEs included in Level 2. Since the data at Level 2 is obtained from fewer UEs compared to the data at Level 1, training on the Level 2 training part may use fewer data than training on the Level 1 training part In this case, a target data set collected from the UEs in the Level 2 group may be applied.

In some implementations of the present disclosure, Case 1 and Case 2 may be performed sequentially/adaptively for each group as follows.

Example 1) Case 1→Case 2

Example 2) Case 2→Case 1→Case 2

Figure 15:
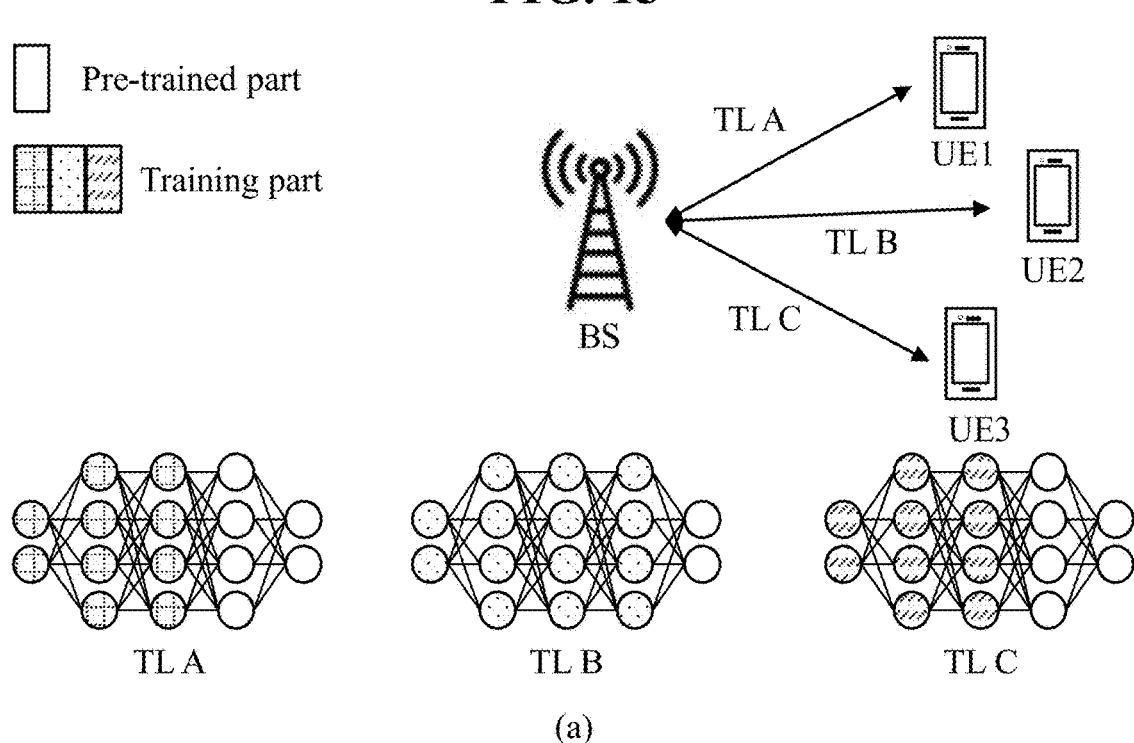
FIG. 15 is a diagram for comparing a conventional TL operation method with a TL operation method according to some implementations of the present disclosure.
Figure 15:
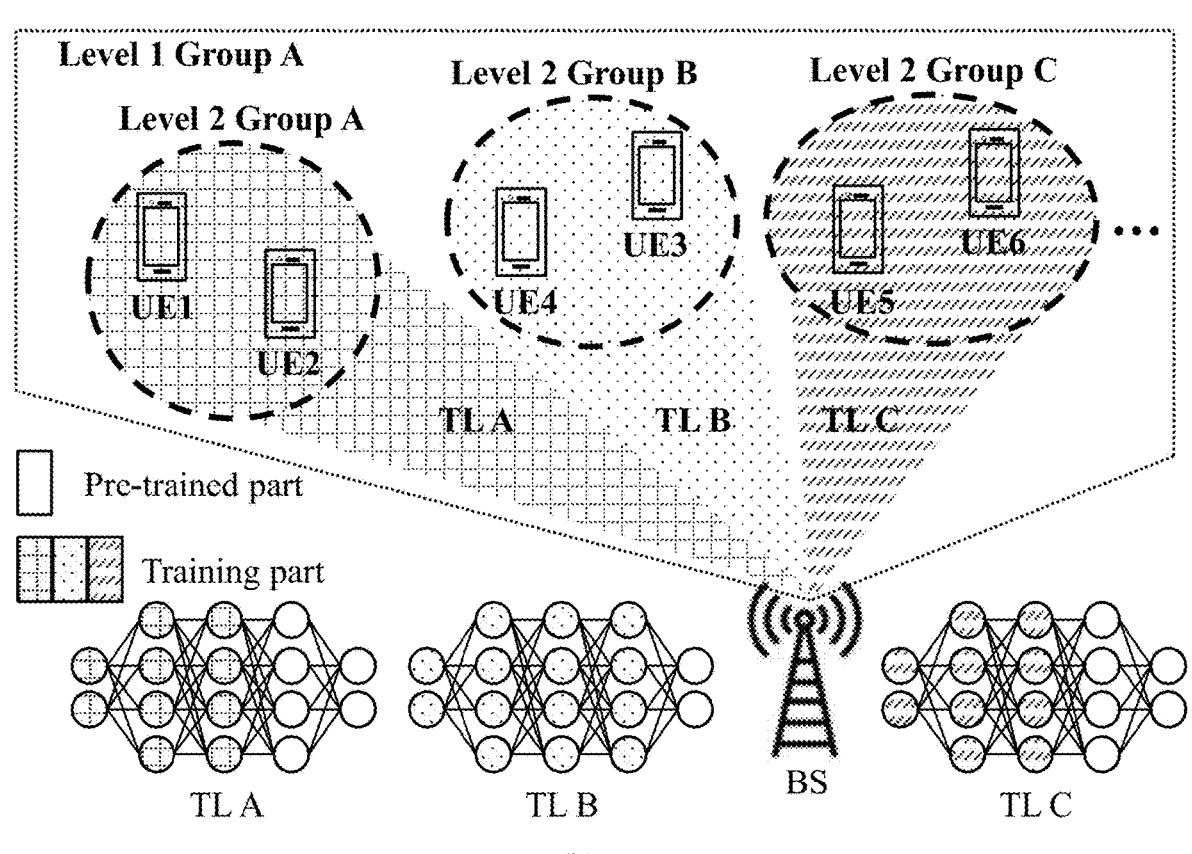

FIG. 15 is provided to compare a conventional TL operation method with a TL operation method according to some implementations of the present disclosure. FIG. 15(*a*) illustrates the conventional TL operation method, while FIG. 15(*b*) illustrates the TL operation method according to some implementations of the present disclosure.

Referring to FIG. 15(*a*), in the conventional TL operation method, TL is applied per UE. On the other hand, referring to FIG. 15(*b*), in the hierarchical TL operation method according to some implementations of the present disclosure, UEs are distinguished based on channel distributions/characteristics, and UEs with the same characteristics use the same TL structure.

Figure 16:
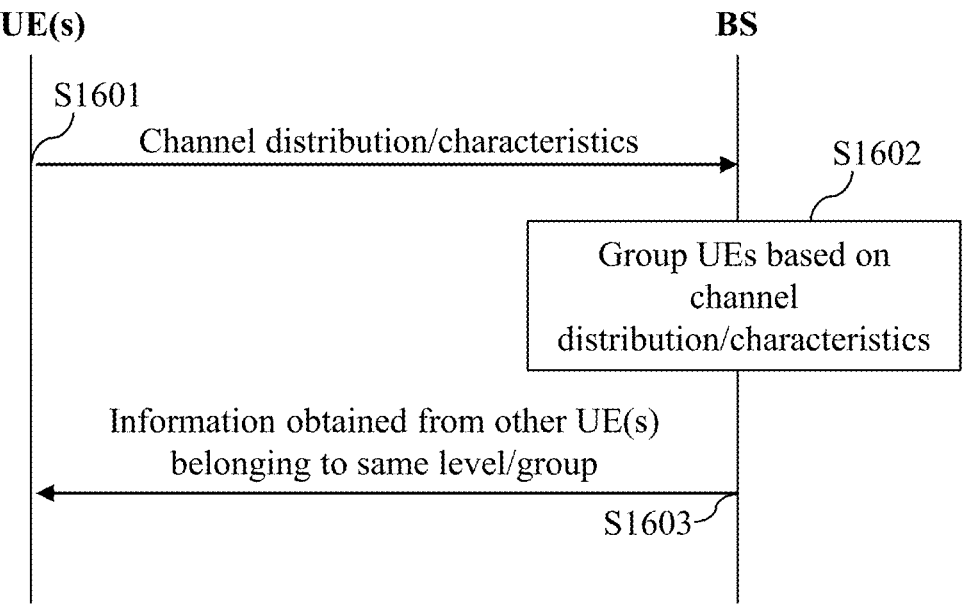
FIG. 16 illustrates an example of a flow of TL according to some implementations of the present disclosure.

FIG. 16 illustrates an example of a flow of TL according to some implementations of the present disclosure.

In the example of FIG. 16, it is assumed that a channel considered during pre-training of an NN and information on pre-trained parameter(s) (e.g., learning rate, mini-batch size, and so on as hyperparameters considered in machine learning) and weight(s) of the NN are shared between a BS and UEs.

The UEs may measure channel distributions and/or characteristics (e.g., RMS delay, UE velocity, PDP, etc.) and report information on the measured channel distributions and/or characteristics to the BS (S1601). The UEs may autonomously measure PDP, DS, and so on and report the results to the BS. Alternatively, the UEs may measure other values that enable the BS to compute the PDP, DS, and so on and report the results to the BS. For example, the UEs may report channel state information (CSI) (e.g., precoding information, rank information, MIMO precoding-related CSI, etc.) measured by the UEs based on reference signal(s) transmitted by the BS.

Based on the measured channel distributions/characteristics of the UEs, the BS may distinguish between the UEs (S1602). In this case, the BS may distinguish between the UEs to operate TL hierarchically by considering the channel during pre-training of the NN, the current channel, UE channel variations, and the number of UEs within a group.

When TL is applied hierarchically, a training part may switch between groups based on the learning progress of UEs (see Examples 1 and 2 described above). The BS may provide UE(s) with information collected within a group at a level suitable for the switched training part (S1603). For example, for a UE learning a Level 1 training part, the BS may provide the UE with information generated from data collected from UEs within a Level 1 group (refer to FIG. 11). Referring to FIG. 15(*b*), the BS may provide UE 1, which learns the Level 1 training part (e.g., general channel distributions/characteristics), with information (e.g., information necessary for training, training results, etc.) generated from data collected from other UEs (e.g., UE 2 to UE 6) in Level 1 group A to which UE 1 belongs. As another example, for a UE learning a Level 2 training part, the BS may provide the corresponding UE with information generated from data collected from UEs within a Level 2 group. Referring to FIG. 15(b), the BS may provide UE 1, which learns the Level 2 training part (e.g., specific channel distributions/characteristics), with information generated from data collected from other UEs (e.g., UE 2) in Level 2 group A to which UE 1 belongs.

For data transmission, a communication device may perform operations according to some implementations of the present disclosure. The transmitting device may include: at least one transceiver; at least one processor; and at least one computer memory operably connected to the at least one processor and configured to store instructions that, when executed, cause the at least one processor to perform the operations according to some implementations of the present disclosure. A processing device for the communication device may include: at least one processor; and at least one computer memory operably connected to the at least one processor and configured to store instructions that, when executed, cause the at least one processor to perform the operations according to some implementations of the present disclosure. A computer-readable (non-transitory) storage medium may be configured to store at least one computer program including instructions that, when executed by at least one processor, cause the at least one processor to perform the operations according to some implementations of the present disclosure. A computer program or computer program product may include instructions stored on at least one computer-readable (non-transitory) storage medium and, when executed, cause (at least one processor) to perform the operations according to some implementations of the present disclosure.

For the communication device, processing device, computer-readable (non-volatile) storage medium, and/or computer program product, the operations may include: receiving information regarding channel characteristics from a plurality of UEs including a first UE; mapping the plurality of UEs to a plurality of TL levels and a plurality of groups for each of the plurality of TL levels based on the information regarding the channel characteristics; and training an NN of the first UE based on the TL levels and groups to which the plurality of UEs are mapped. Training the NN of the first UE may include training a training part for a first TL level among TL levels to which the first UE is mapped.

In some implementations, training the training part for the first TL level among the TL levels to which the first UE is mapped may include: generating first transfer information based on learning results received from other UEs belonging to a first TL level group to which the first UE is mapped among groups of the first TL level; and transferring the first transfer information to the first UE.

In some implementations, training the NN of the first UE may include: training a training part for a second TL level, which is different from the first TL level, among the TL levels to which the first UE is mapped; generating second transfer information based on learning results received from other UEs belonging to a second TL level group to which the first UE is mapped among groups of the second TL level; and transferring the second transfer information to the first UE. The groups of the second TL level may be included in one of the groups of the first TL level.

In some implementations, the first transfer information may include parameters and weights of an NN trained by the other UEs belonging to the first TL level group.

In some implementations, the communication device may be a network device (e.g., BS, server, etc.). In some implementations, the communication device may be a UE.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

The invention claimed is:

1. A method performed by a communication device, the method comprising:

receiving information regarding channel characteristics from a plurality of user equipments (UEs);

grouping the plurality of UEs into a plurality of UE groups for each of a plurality of transfer learning (TL) levels, based on the information regarding the channel characteristics, wherein the plurality of TL levels includes at least a first TL level and a second TL level, wherein the plurality of UEs is grouped into at least two UE groups for the first TL level, and wherein UEs belonging to a same UE group for the first TL level are grouped into at least two UE groups for the second TL level; and performing TL per UE group at each TL level, that comprises:

transferring first transfer information to a first UE that performs learning a training part for the first TL level in a neural network, wherein the first transfer information is generated based on learning results from another UE belonging to a same UE group as a UE group for the first TL level to which the first UE belongs.

2. The method of claim 1, wherein performing the TL comprises:

transferring second transfer information to a second UE that performs a training part for the second TL level in the neural network, wherein the second transfer information is generated based on learning results received from another UE belonging to a same UE group as a UE group for the second TL level to which the second UE belongs.

3. The method of claim 1, wherein the first transfer information includes parameters and weights of the training part for the first TL level.

4. A communication device comprising:

at least one transceiver;

at least one processor; and at least one computer memory operably connected to the at least one processor and configured to store instructions that, when executed, cause the at least one processor to perform operations comprising:

grouping the plurality of UEs into a plurality of UE groups for each of a plurality of transfer learning (TL) levels, based on the information regarding the channel characteristics, wherein the plurality of TL levels includes at least a first TL level and a second TL level, wherein the plurality of UEs is grouped into at least two UE groups for the first TL level, and wherein UEs belonging to a same UE group for the first TL level are grouped into at least two UE groups for the second TL level; and performing TL per UE group at each TL level, that comprises:

transferring first transfer information to a first UE that performs learning a training part for the first TL level in a neural network, wherein the first transfer information is generated based on learning results from another UE belonging to a same UE group as a UE group for the first TL level to which the first UE belongs.

5. A non-transitory computer-readable storage medium configured to store at least one program code comprising instructions that, when executed, cause at least one processor to perform operations comprising:

grouping the plurality of UEs into a plurality of UE groups for each of a plurality of transfer learning (TL) levels, based on the information regarding the channel characteristics, wherein the plurality of TL levels includes at least a first TL level and a second TL level, wherein the plurality of UEs is grouped into at least two UE groups for the first TL level, and wherein UEs belonging to a same UE group for the first TL level are grouped into at least two UE groups for the second TL level; and performing TL per UE group at each TL level, that comprises:

transferring first transfer information to a first UE that performs learning a training part for the first TL level in a neural network, wherein the first transfer information is generated based on learning results from another UE belonging to a same UE group as a UE group for the first TL level to which the first UE belongs.

6. The communication device of claim 4, wherein performing the TL comprises:

transferring second transfer information to a second UE that performs a training part for the second TL level in the neural network, wherein the second transfer information is generated based on learning results received from another UE belonging to a same UE group as a UE group for the second TL level to which the second UE belongs.

7. The communication device of claim 4, wherein the first transfer information includes parameters and weights of the training part for the first TL level.

8. The non-transitory computer-readable storage medium of claim 5, wherein performing the TL comprises:

transferring second transfer information to a second UE that performs a training part for the second TL level in the neural network, wherein the second transfer information is generated based on learning results received from another UE belonging to a same UE group as a UE group for the second TL level to which the second UE belongs.

9. The non-transitory computer-readable storage medium of claim 5, wherein the first transfer information includes parameters and weights of the training part for the first TL level.

\*   \*   \*   \*   \*